United States Patent [19]

Mendoza

[11] 4,226,582

[45] Oct. 7, 1980

[54] PROCESS AND APPARATUS FOR THE INSTANTANEOUS COMBUSTION OF DIAFANOUS LIQUID PETROLEUM, DIESEL OR SIMILAR FUELS

[76] Inventor: Fausto C. Mendoza, Cumbres de Acultzingo #185, Lomas de Chapultepec, Mexico, 10DF

[21] Appl. No.: 912,881

[22] Filed: Jun. 5, 1978

[51] Int. Cl.[3] .............. H01M 4/70

[52] U.S. Cl. .............. 431/239; 239/138; 48/180 F

[58] Field of Search .............. 431/354, 239; 137/604; 239/138; 48/180 C, 180 F

[56] References Cited

U.S. PATENT DOCUMENTS

| | | | |
|---|---|---|---|
| 723,206 | 3/1903 | Luckenbach | 239/138 |
| 902,707 | 11/1908 | Browne | 239/138 X |
| 947,014 | 1/1910 | Faber | 48/180 F |
| 1,111,109 | 9/1914 | Tracy, Jr. | 431/239 X |
| 1,202,425 | 10/1916 | Randall | 137/604 X |
| 1,344,333 | 6/1970 | Clouston | 431/239 |
| 1,466,006 | 8/1923 | Trood | 48/180 F |
| 1,755,602 | 4/1930 | Jacobson | 431/239 X |
| 3,361,183 | 7/1965 | Reichelm | 431/239 X |

FOREIGN PATENT DOCUMENTS

| | | | |
|---|---|---|---|
| 480004 | 4/1953 | Italy | 239/138 |
| 77798 | of 1938 | Netherlands | 239/138 |

*Primary Examiner*—Carroll B. Dority, Jr.
*Assistant Examiner*—Randall L. Green
*Attorney, Agent, or Firm*—Albert L. Jeffers; John F. Hoffman

[57] ABSTRACT

A process and apparatus for the production of heat, equivalent in clarity and cleanliness to that of propane, butane or natural gas, but at a lower cost and without the problems or dangers of storage nor risks of fire or explosion during handling, by means of the instantaneous combustion of diafanous liquid petroleum, diesel or other similar combustible fuels mixed with compressed air in an environment which is neither contaminated nor degraded. Thus, it is possible to regulate the flow and simultaneously divide each volume of combustible liquid into particles so small that they distribute and integrate themslves homogenously in a volume of air proportionally adequate for proper combustion.

7 Claims, 4 Drawing Figures

PROCESS AND APPARATUS FOR THE INSTANTANEOUS COMBUSTION OF DIAFANOUS LIQUID PETROLEUM, DIESEL OR SIMILAR FUELS

BACKGROUND OF THE INVENTION

One type of device presently in use for the production of heat by means of the combustion of fuel oil, diafanous petroleum and diesel fuel comprises an apparatus in the form of a horn, which receives the liquid fuel (diafanous petroleum, diesel or fuel oil) into whch, upon entering, a current of air is simultaneously injected driven by a ventilator. This current of air is mixed with the fuel during the movement of rotation produced by the spiral blades with which the apparatus is equipped for this purpose. The result is a mixture of air-petroleum, that is combustible air, which produces a defective combustion with a reddish flame, substantially different from that which is obtained with butane, propane or natural gas. As a consequence, this system is only applicable for heat production in places where a deficient combustion with residues and a petroleum odor are acceptable.

In another prior art system, the petroleum is heated until it is transformed into vapor and is then mixed with the volumes of air necessary for combustion, for which an initial source of heat is required in order to convert the liquid petroleum to vapor and simultaneously heat the volumes of air necessary for combustion, which in the case of diafanous petroleum consist of 9,000 volumes of air for every volume of liquid petroleum. Once this mixture has been achieved, good combustion is obtained, comparable in clarity and heat to that of butane, propane or natural gas, but with the serious disadvantage that this vapor mixture of hot air-petroleum is unstable and must be burned immediately, since if transportation of the mixture by means of pipes is attempted, it loses temperature and the petroleum condenses, if not totally, at least partially, thus spoiling the combustion. Another inconvenience is that in order for this process to function, there is a delay of several minutes until the apparatus is hot and the vaporization of the petroleum begins.

Of all the domestic burners, the simplest is the vaprorizing type known as "blue flame natural draft". It is constructed of a series of two or more concentric cylinders, perforated and arranged in order to receive the petroleum through gravity. In the base it has a fuse placed between the cylinders, which is where the evaporation initiates. When the vapor rises between the cylinders, the air is pulled through the perforations and mixes with the petroleum vapor. The flame starts at the base, but as the burner begins to heat up, the vapor rises with greater speed and the flame takes on a blue color. This system requires several minutes of heating in order to operate and even when working at maximum efficiency, its heating capacity is slight and its handling clumsy, for which reasons its applications are very limited.

SUMMARY OF THE INVENTION

The process and apparatus do not possess any of the disadvantages mentioned in the previous systems, and possess many advantages, since by using liquid diafanous petroleum, diesel or any other similar fuel, it is possible to produce in an instantaneous manner a complete and clear combustion such as the best of butane, propane or natural gas. This is because it makes it possible to divide each volume of combustible liquid (petroleum in this case) into particles so small that they can be dispersed and integrated homogeneously in the volume of air for proper combustion. The proportion theoretically should be 9,000 volumes of air for each volume of petroleum.

This mixture of such a small amount of petroleum—1 volume distributed among 9,000 volumes of air—is achieved by the process and apparatus of the present invention. Through taking advantage of the property of compressed air that in the moment in which it escapes at a certain velocity through a small perforation in its conduit, this spreading out and losing pressure precisely at the exit of the liquid fuel, one achieves the suctioning of the fuel towards its exit, where the petroleum divides upon coming into contact with the compressed air and there its particles are distributed homogeneously in the volume of air required for proper combustion.

Take, for example, the case of 10 grams of liquid petroleum which flows through a conduit and which is pulled and incorporated into a current of compressed air which increases its volume several times upon coming out of its conduit, expanding and escaping at 200 meters per minute. In other words, 10 grams of liquid petroleum has 1 minute to incorporate itself gradually into an air flow 200 meters long and various centimeters in diameter, which is equivalent to the proportion of 9,000 volumes of air for 1 volume of petroleum.

Because the residues of the combustion interfere with the flame, the complete system has been arranged so that it is located and operated within a chamber whose interior air is introduced or injected from outside the combustion zone through a third conduit. The conduit also serves to surround the conduit which supplies the petroleum or liquid fuel, thereby maintaining an adequate temperature in order to avoid gasification and consequent deterioration of the combustion.

As a consequence of the above, it can be deduced that in the process and apparatus of the present invention, the processes and devices which are used traditionally are simplified and function more efficiently, rapidly and cheaply. In addition, the control over the proportion of the mixture of the air and liquid fuel is optimized and the resulting mixture is extremely light, volatile and instantaneously combustible, to thereby produce a powerful, consistent flame of great quality and clarity, comparable to the best of propane, butane or natural gas, but without the risks and inconveniences in handling and storage and the high cost of these fuels.

These other objectives and advantages obtainable through the use of this invention will be better understood upon reading the following description, which makes reference to the preferred embodiment of the invention.

DETAILED DESCRIPTION OF THE INVENTION

Figure 1:
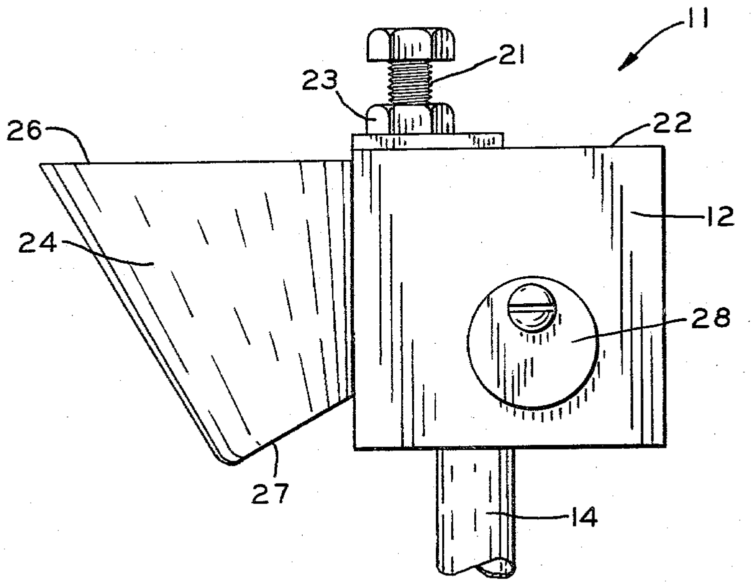
FIG. 1 is a side elevational view of the apparatus.
Figure 2:
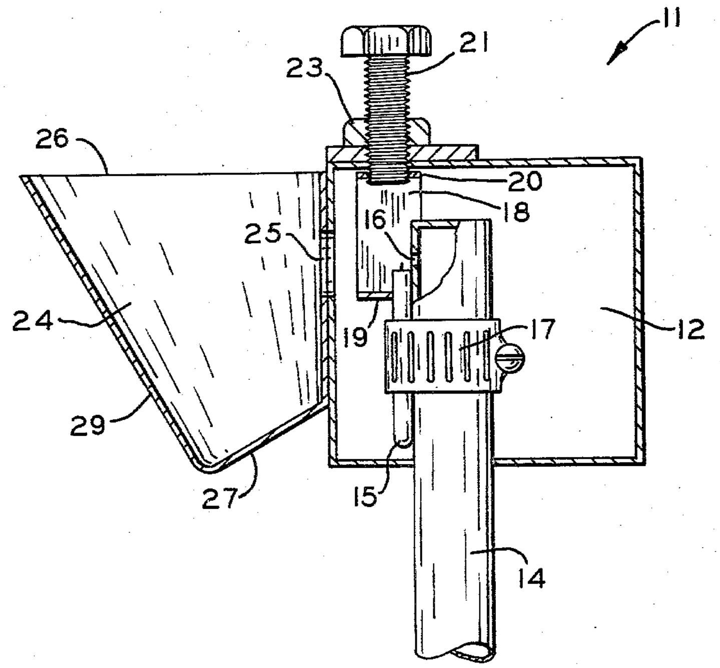
FIG. 2 is a transverse sectional view of the apparatus of FIG. 1.
Figure 3:
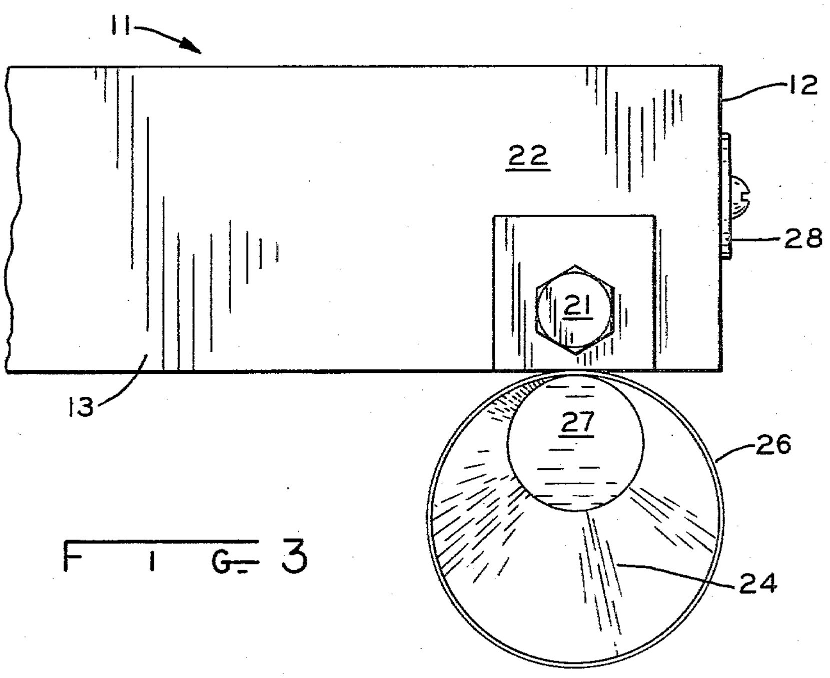
FIG. 3 is a plan view of the apparatus.
Figure 4:
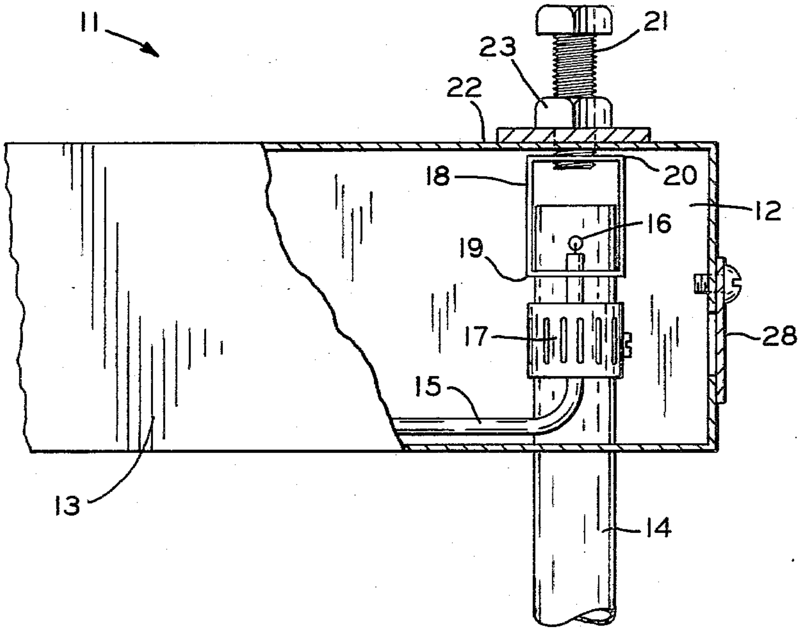
FIG. 4 is a front elevational view of the apparatus partially in section.

The process according to the invention for the combustion in an instantaneous fashion of diafanous liquid petroleum, diesel or similar fuels, comprises feeding the fuel up to the place of ignition by means of the suction produced by the pressured air which is supplied directly at the exit of the combustible liquid through a perforation in the conduit of the pressured air in such a way that as it is liberated, the pressured air increases in volume. The expansion of the air, together with the increment in its escape velocity and displacement, as well as its loss of pressure precisely at the exit of the combustible liquid, permits the suctioning of the combustible liquid along its conduit unitl it reaches its exit and comes into contact with the air, where it is caught or captured by the same. This makes it possible for the petroleum to divide into particles so small that they become distributed and integrated homogeneously in the volume of air which is required to propitiate a proper combustion, the proportion of air-liquid fuel being achieved automatically through this method.

The entire system is placed inside a chamber whose interior air is introduced or injected from outside the zone of combustion through a third conduit, which not only serves to feed surrounding air into the air-combustible liquid mixture thus helping to isolate the residues of the combustion, but also serves to enclose the conduit which supplies the combustible liquid thereby cooling it and preventing it from gasifying and altering the functioning of the system. This can be done by means of the apparatus 11, which is made up of a chamber of surrounding air 12 fed by a conduit 13 which may be placed horizontally and constituted by means of a tubular portion, which itself may form the chamber of surrounding air 12. In the interior of chamber 12 are a vertically disposed conduit of pressured air 14 and a conduit for the combustible liquid 15, whose exits coincide.

The conduit of pressured air 14 has near its closed end a lateral orifice 16 in a radial position, which serves as the outlet of the conduit of pressured air, thus causing the escape velocity and volume to increase upon the passage of the pressured air through this outlet. This causes a drop in the pressure of the air, and the combustible liquid is suctioned through its conduit, up to its outlet, where it is captured upon contacting the air. This causes disintegration of the fuel into particles so small that they become distributed and integrated homogeneously within the volume of air required for proper combustion.

The conduit of combustible liquid 15 may be of smaller diameter than that of the pressured air 14 and be completely contained within the conduit of the surrounding air 13 with the object of having this last act as an enclosure for it, isolating it from the high temperatures of the combustion zone, and maintaining it cool so as to avoid the gasification of the fuel, which would cause improper functioning of the system.

The conduit of pressured air 14, which may be oriented perpendicularly to the chamber and conduit of surrounding air 12, is removably attached to conduit 15 by means of a clamp to which access may be had from outside the chamber of surrounding air 12 through an opening which is sealable by means of a removable cover 28. Conduit 15 is bent in order to remain parallel to the conduit of pressured air 14 so that their outlets coincide.

With the object of regulating the relative positions of the outlets of conduits of pressured air 14 and combustible liquid 15, the apparatus is equipped with a mechanism by means of which the position of the conduit of the combustible liquid 15 may be regulated with respect to the outlet of the conduit of pressured air 14. This mechanism comprises a frame 18 into the lower side 19 of which the conduit 15 is introduced and is fastened at a reasonable distance from its outlet. Into the upper side 20 of frame 18 a screw 21 is secured. Screw 21 passes through the upper wall 22 of the chamber of surrounding air 12 and is threadedly engaged with nut 23, which is secured to upper wall 22, by turning screw 21, frame 18 and conduit 15 may be raised and lowered.

Fastened to the exterior of chamber 12 opposite outlet 16 is a deflector chamber 24. Chamber 24 includes an opening 25 which coincides with and is aligned with outlet 16 of conduit 14 and an opening in chamber 12. The mixture of air-combustible liquid is propelled through opening 25 in order to be ignited in deflector chamber 24, which may take the form of a cone open at the top 26. The lower portion of chamber 24 comprises a straight section 27 and an inclined section 29 with the object of optimizing the formation of the flame.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and fall within the limits of the appended claims.

What is claimed is:

1. A process for the instantaneous combustion of liquid diafanous petroleum, diesel, or similar fuels comprising:

- feeding the fuel through a fuel conduit to an enclosed mixing chamber,
- within said chamber, directing pressurized air across the outlet of the fuel conduit through an orifice so as to cause the pressurized air to expand, lower in pressure and achieve a high velocity precisely at the fuel conduit outlet to thereby suction the fuel from the conduit and disperse the fuel into small droplets and distribute the dispersed fuel homogeneously into the air to form an air-fuel mixture,
- ventilating the mixing chamber with ambient air, and
- projecting the air-fuel mixture through an opening in the mixing chamber into an ignition chamber,
- said mixing chamber being substantially isolated from the ignition chamber.

2. Apparatus for the instantaneous combustion of liquid diafanous petroleum, diesel, or similar fuels comprising:

- a ventilation chamber in communication with the atmosphere and having an opening,
- a fuel supply conduit in said chamber and having an outlet,
- a pressurized air supply conduit in said chamber and having a small outlet orifice,
- said fuel conduit outlet and said air conduit orifice being in close proximity to each other,
- said chamber being ventilated with air fed into said chamber from the atmosphere, a deflector chamber having an inlet which coincides with said ventilation chamber opening and is adjacent said air conduit orifice, said deflector chamber being open at its upper extremity and closed at its lower extremity.

3. The apparatus of claim 2 including means for adjusting the positions of said fuel conduit outlet and said air supply orifice relative to each other.

4. The apparatus of claim 3 wherein said air conduit is fixed relative to said ventilation chamber, said fuel conduit is fastened to a frame member, and said frame member is connected to said ventilation chamber by means of an adjusting screw, and including means for raising and lowering said fuel conduit within said ventilation chamber.

5. The apparatus of claim 4 wherein said fuel conduit is removably attached to said air supply conduit by means of a clamp, and said chamber includes a closable opening through which access may be had to said clamp.

6. A process for the instantaneous combustion of liquid diafanous petroleum, diesel, or similar fuels comprising:

feeding the fuel through a fuel conduit to an enclosed mixing chamber, the fuel conduit having a substantial portion of its length disposed within the mixing chamber so as to cool the fuel and isolate it from the combustion temperatures, within said chamber, directing pressurized air precisely across the outlet of the fuel conduit through a small orifice so as to cause the pressurized air to expand, lower in pressure and achieve a high velocity precisely at the fuel conduit outlet to thereby suction the fuel from the conduit and disperse the fuel into small droplets and distribute the dispersed fuel homogeneously into the air to form an air-fuel mixture, ventilating the mixing chamber with ambient air, and projecting the air-fuel mixture into an ignition chamber through an opening in a wall separating the mixing and ignition chamber, said opening in the wall being much smaller than the wall so that the mixing chamber is substantially isolated from the ignition chamber.

7. Apparatus for the instantaneous combustion of liquid diafanous petroleum, diesel, or similar fuels comprising:

a ventilation chamber in communication with the atmosphere and having an opening, a fuel supply conduit having a substantial portion of its length in said chamber and having an outlet in said chamber, a pressurized air supply conduit in said chamber and having a small outlet orifice in said chamber, said fuel conduit outlet and said air conduit orifice being in close proximity to each other such that pressurized air from said air conduit orifice is directed precisely across said fuel conduit outlet, said chamber being ventilated with air fed into said chamber from the atmosphere, a generally conical deflector chamber having an inlet which coincides with said ventilation chamber opening and is adjacent said air conduit orifice, said deflector chamber being open at its upper wider extremity and closed at its narrower lower extremity.

* * * * *